(12) United States Patent
Mango

(10) Patent No.: US 8,273,937 B2
(45) Date of Patent: Sep. 25, 2012

(54) GENERATING NATURAL GAS FROM HEAVY HYDROCARBONS

(75) Inventor: Frank D. Mango, Houston, TX (US)

(73) Assignee: Petroleum Habitats, LLC, Houston, TX (US)

( * ) Notice: Subject to any disclaimer, the term of this patent is extended or adjusted under 35 U.S.C. 154(b) by 0 days.

(21) Appl. No.: 12/962,302

(22) Filed: Dec. 7, 2010

(65) Prior Publication Data

US 2011/0077445 A1    Mar. 31, 2011

Related U.S. Application Data

(63) Continuation of application No. 12/159,962, filed as application No. PCT/US2007/060215 on Jan. 8, 2007, now Pat. No. 7,845,414.

(60) Provisional application No. 60/757,168, filed on Jan. 6, 2006.

(51) Int. Cl.
*C07C 4/00* (2006.01)

(52) U.S. Cl. ........ 585/752; 585/700; 585/708; 208/113; 208/118; 208/119; 208/121; 208/146; 208/150

(58) Field of Classification Search .......... 208/44, 208/106, 113, 118, 119, 120.01, 121, 146, 208/150; 585/708, 752
See application file for complete search history.

(56) References Cited

U.S. PATENT DOCUMENTS

| | | | |
|---|---|---|---|
| 2,387,513 A | 10/1945 | Hocott | |
| 2,551,449 A | 5/1951 | Menke | |
| 2,705,417 A | 4/1955 | Romo et al. | |
| 2,768,793 A | 10/1956 | Bonner | |
| 2,854,396 A | 9/1958 | Hunt et al. | |
| 3,033,287 A | 5/1962 | Bond | |
| 3,180,902 A | 4/1965 | Andersen et al. | |
| 3,322,195 A | 5/1967 | Brown et al. | |
| 3,343,917 A | 9/1967 | Friedman | |
| 3,428,431 A | 2/1969 | Billings | |
| 3,719,453 A | 3/1973 | Erdman | |
| 3,752,984 A | 8/1973 | Scott et al. | |
| 3,934,455 A | 1/1976 | Harrisberger | |
| 4,081,675 A | 3/1978 | Bartz | |
| 4,108,552 A | 8/1978 | Austin et al. | |
| 4,205,956 A | 6/1980 | Stedman | |
| 4,334,882 A | 6/1982 | Edwards | |
| 4,345,912 A | 8/1982 | Bartz | |
| 4,352,673 A | 10/1982 | Espitalie et al. | |
| 4,385,983 A * | 5/1983 | Rosenthal et al. | 208/427 |
| 4,426,452 A | 1/1984 | Lasoski | |
| 4,438,816 A * | 3/1984 | Urban et al. | 166/303 |
| 4,507,195 A * | 3/1985 | Spars et al. | 208/410 |

(Continued)

OTHER PUBLICATIONS

Gordon, et al., The Chemist's Companion, John Wiley & Sons, 1972.*

(Continued)

*Primary Examiner* — In Suk Bullock
*Assistant Examiner* — Bradley Etherton
(74) *Attorney, Agent, or Firm* — Winstead PC

(57) ABSTRACT

Methods for producing in a reactor natural gas from heavy hydrocarbons. A mixture of heavy hydrocarbons and a catalyst comprising a transition metal are heated under an anoxic condition in a reactor. Natural gas, e.g., catalytic natural gas, is generated from the heavy hydrocarbons by a disproportionation reaction promoted by the catalyst. The anoxic condition can be created by flowing an anoxic stimulation gas in the reactor.

17 Claims, 1 Drawing Sheet

U.S. PATENT DOCUMENTS

| | | | |
|---|---|---|---|
| 4,587,847 | A | 5/1986 | Malmqvist et al. |
| 4,610,776 | A * | 9/1986 | Urban et al. ............... 208/418 |
| 4,681,854 | A | 7/1987 | Feazel |
| 4,701,270 | A | 10/1987 | Bullen et al. |
| 4,792,526 | A | 12/1988 | Ouellette et al. |
| 4,798,805 | A | 1/1989 | Issenmann |
| 5,082,787 | A * | 1/1992 | Nolte et al. ................. 436/31 |
| 5,097,123 | A | 3/1992 | Grau et al. |
| 5,174,966 | A | 12/1992 | Durand et al. |
| 5,178,837 | A | 1/1993 | Crisp |
| 5,389,550 | A | 2/1995 | Ishida et al. |
| 5,769,165 | A | 6/1998 | Bross et al. |
| 6,225,359 | B1 | 5/2001 | O'Rear et al. |
| 6,229,060 | B1 * | 5/2001 | Vidal et al. ................. 585/708 |
| 6,666,067 | B2 | 12/2003 | Stolper |
| 6,739,394 | B2 | 5/2004 | Vinegar et al. |
| 7,153,688 | B2 | 12/2006 | Mango |
| 7,435,597 | B2 | 10/2008 | Mango |
| 7,608,170 | B1 | 10/2009 | Ousey |
| 7,845,414 | B2 | 12/2010 | Mango |
| 2002/0002318 | A1 | 1/2002 | O'Rear et al. |
| 2002/0058581 | A1 | 5/2002 | Youngman et al. |
| 2004/0016676 | A1 * | 1/2004 | Newton ................ 208/113 |
| 2004/0166582 | A1 | 8/2004 | Prinzhofer et al. |
| 2005/0082058 | A1 | 4/2005 | Bustin et al. |
| 2005/0250209 | A1 | 11/2005 | Mango |
| 2006/0065400 | A1 | 3/2006 | Smith |
| 2006/0117841 | A1 | 6/2006 | Mango |
| 2006/0121615 | A1 | 6/2006 | Mango |
| 2006/0191686 | A1 | 8/2006 | Blauch et al. |
| 2008/0115935 | A1 | 5/2008 | Mango |
| 2009/0014179 | A1 | 1/2009 | Mango |
| 2010/0200234 | A1 | 8/2010 | Mango |
| 2011/0077445 | A1 | 3/2011 | Mango |

OTHER PUBLICATIONS

Taulbee, "Measurement of Adsorption and Cracking of Hydrocarbons over Processed Oil Shale Particles" in Fuel, 74(8), p. 1133-1139, 1995.*

Smith, et al., "Direct Determination of Sulfur Forms in Green River Oil Shale" in Analytical Chemistry, 36(3), 618-622, 1964.*

Dieckmann et al., "Kinetics of petroleum generation and cracking by programmed-temperature closed-system pyrolysis of toarcian shales", Fuel 1998, 77, 23-31.

Schaefer et al., "Reaction kinetics of gas generation in selected source rocks of the west siberian basin: implications for the mass balance of early-thermogenic methane", Chemical Geology 1999, 156, 41-65.

Michels et al., "Understanding of reservoir gas compositions in a natural case using stepwise semi-open artificial maturation", Marine and Petroleum Geology 2002, 19, 589-599.

Ramaswamy, "A field evidence for mineral-catalyzed formation of gas during coal maturation", Oil & Gas Journal 2002, 100, 32-36.

Sams et al., "Validatoin of a geochemical logging tool for in situ major element analysis in boreholes using inductively coupled plasma atomic emission spectrometry", Analyst 1995, 120, 1407-1413.

International Search Report and Written Opinion, PCT/US09/069753, dated Sep. 9, 2010.

Mango et al., 2009, Low-Temperature Gas Generated from Marine Shales, Geochem. Trans., 2009 10:3, (DOI:10.1186/1467-4866-10-3).

Fox, "E&P Industry Chokes Back", 2010, http://stocks.investopedia.com/stock-analysis/2010/E—P-Industry-Chokes-Back-NOG-HK-DVN-STR0312.aspx.

Mango et al, 2009, Natural Gas at Thermodynamic Equilibrium: Implications for the Origin of Natural Gas, Geochem. Trans. 10:6. (DOI:10.1186/1467-4866-10-6.

Mango et al., 2009a, Low-Temperature Gas from Marine Shales: Wet Gas to Dry Gas Over Experimental Time, Geochem. Trans. 10:10, (DOI:10.1186/1467-4866-10-10).

Mango et al., 2010, Metathesis in the Generation of Low-Temperature Gas in Marine Shales, Geochem. Trans. 11:1, (DOI:10.1186/1467-4866-11-1).

Mango et al., 2010, Natural Catalytic Activity in a Marine Shale for Generating Natural Gas, Proceedings Royal Society A, published online Apr. 21, 2010; 466, 3527-3537, doi: 10.1098/rspa.2010.0032).

International Search Report and Written Opinion, PCT/US11/035276, dated Aug. 11, 2011.

Jin et al., "Catalysis and hydrogenation: volcanic activity and hydrocarbon generation in rifts basins, eastern china", Applied Geochemistry 1999, 14, 547-558.

Jin et al., "Volcanic and thermal-water activities and hydrocarbon generations in the rift basins, eastern china" Chinese Journal of Geology 2003, 38, 342-349.

Mango, "The catalytic decomposition of petroleum into natural gas", Geochimica et Cosmochimica Acta 1997, 61, 5347-5350.

Rafiqul, "Study on the formation of gas phase during thermal alteration of petroleum" Journal of Bangladesh Academy of Sciences 1995, 19, 97-104.

Starobinets et al., "Study of the catalytic effect of rocks of different lithological composition on the formation of gaseous hydrocarbons from natural organic compounds", Institut Geologii i Razvedki Neftyanykh i Gazovykh Mestorozhdenii 1975, 17, 108-114.

Lee, D.S.; "Determination of nickel in seawater by carbonyl generation" Analytical Chemistry 1982; 54,1182-1184.

Drews, W., et al.; "Flow-injection system for the determination of nickel by means of MIP-OES after conversion to Ni) CO)4", Fresenius' Zeitschrift fuer Analytische Chemie 1989, 332, 862-865.

Schaefer, W., "Determination of traces of tetracarbonylnickel and pentacarbonyliron in streams of fluids such as syntheis gas", Fresenius' Zeitschrift fuer Analytische Chemie 1989, 335, 785-790.

Mihaylov, M., et al.; "Formation of Ni(CO)4 during the interaction between CO and silica-supported nickel catalyst: an FTIR spectroscopic study", Catalysis Letters 2001; 76, 59-63.

Mango, "The origin of light hydrocarbons," Geochimica et cosmochimica Acta, 2000, 64, 1265-1277.

Mango, "The light hydrocarbons in petroleum: a critical review," Org. Geochem., vol. 26, No. 7/8, pp. 417-440, 1997.

Mango, "Methane concentrations in natural gas: the genetic implications," Org. Geochem., 32, 1283-1287, 2001.

Air Products & Chemicals, Inc., et al.; Excert of Topical Report entitled "Alternative Fuels Field Test Unit Support to Kindsport LPMEOH(TM) Demonstration Unit," (Dec. 1997) p. 17 only.

Excerpt from website http://www.angelfire.com/treklgalactic_mining/carbonyl.htm, "Near Earth Asteroid Utilization and Carbonyl Metallurgical Processes," (Apr. 2002) 2 pgs.

Hunt, Petroleum Geochemistry and Geology, 2nd ed., W. H. Freeman, New York., Chapter 7, 1996.

Paine et al., "Geology of natural gas in South Louisiana," American Association of Petroleum Geologists, Memoir 9, vol. 1, Natural Gases of North America, Beebe, B. W., Editor, 376-581, 1968.

Price, "Thermal stability of hydrocarbons in nature: Limits, evidence, characteristics, and possible controls," Geochimica et Cosmochimica Acta, 57:3261-3280, 1993.

Littke et al., "Gas generation and accumulation in the West Siberian basin", AAPG Bull., 83:1642-1665, 1999.

Domine et al., "Towards a new method of geochemical kinetic modelling: implications for the stability of crude oils", Organic Geochemistry, 28:597-612, 1998.

Domine et al., "Up to what temperature is petroleum stable? New insights from 5200 free radical reaction model," Organic Geochemistry, 33:1487-1499, 2002.

Mallinson et al., "Detailed chemical kinetics study of the role of pressure in butane pyrolysis," Industrial & Engineering Chemistry, Research, 31:37-45, 1992.

Burnham et al., "Unraveling the kinetics of petroleum destruction by using 1,213C isotopically labeled dopants," Energy & Fuels, 9:190-191, 1995.

Jackson et al., "Temperature and pressure dependence of n-hexadecane cracking," Organic Geochemistry, 23:941-953, 1995).

Mango, et al., "The carbon isotopic composition of catalytic gas: A comparative analysis with natural gas," Geochimica et Cosmochimica Acta, 63:1097-1106 (Jan. 1999).

Mango, "Transition metal catalysis in the generation of petroleum and natural gas," Geochimica et Cosmochimica Acta. 56:553-555, 1992).

Boggs, Jr., "Principles of Sedimentology and Stratigraphy," Prentice-Hall, Inc., 2nd ed., pp. 165 and 195 (1995).

Medina, et al., "Low temperature iron- and nickel-catalyzed reactions leading to coalbed gas formation," Geochimica et Cosmochimica Acta, 64:643-649 (Feb. 2000).

Galbreath, et al., "Chemical Speciation of Nickel in Residual Oil Ash," Energy & Fuels, 12:818-822 (Jun. 1998).

Seewald, "Organic-inorganic interactions in petroleum-producing sedimentary basins," Nature, 426-327-333 (Nov. 2003).

Mann, et al., Organic Facies Variations, Source Rock Potential, and Sea Level Changes in Cretaceous Black Shales of the Quebrada Ocal, Upper Magdalena Valley, Colombia, American Association of Petroleum Geologists Bulletin, 81:556-576 (Apr. 1997).

Cruickshank, et al., "Mineral Deposits at the Shelfbreak," SEPM Special Publication No. 33, (Jun. 1983) pp. 429-431.

Snowdon, L.R., et al.; "Identification of Petroleum Source Rocks Using Hydrocarbon Gas and Organic Carbon Content"; Geological Survey of Canada; Dept. of Energy, Mines and Resources; Paper 72-36; 1972.

International Search Report and Written Opinion, PCT/US07/078660, Jul. 23, 2009.

International Search Report and Written Opinion, PCT/US07/60215, dated Sep. 27, 2007.

Mango et al., "Low-Temperature Gas Generated from Marine Shales", Geochem. Trans., 2009, (DOI:10.1186/1467-4866-10-3).

Bassett et al., Metathesis of Alkanes and Related Reactions, Accts. Chem. Res., 2010, 43, 323-334.

Espitalie et al., "Role of the mineral matrix during kerogen pyrolysis", Org Geochem 1984, 6, 365-379 and 381-382.

Ungerer et al., "Extrapolation of the kietics of oil and gas formation from laboratory experiments to sedimentary basins", Nature 1987, 327, 52-54.

Dembicki, "The effects of the mineral matrix on the determination of kinetic parameters using modified rock eval pyrolysis", Organic Geochemistry 1992, 18, 531-539.

Braun et al., "Oil and gas evolution kinetics for oil shale and petroleum source rocks determined from pyrolysis-TWMS data at two heating rates", Energy & Fuels 1992, 6, 468-474.

Barth et al, "Estimating kinetic parameters for generation of petroluem and single compounds from hydrous pyrolysis of source rocks", Energy & Fuels 1993, 7, 100-110.

Mango, "Transition metal catalysis in the generation of petroluem and natural gas. progress report", 1992 OSTI as DE93019698; NTIS.

Mango, "Role of transition-metal catalysis in the formation of natural gas", Nature 1994, 368, 536-538.

Reynolds et al., "Comparison of kinetic analysis of source rocks and kerogen concentrates", Organic Geochemistry 1995, 23, 11-19.

McNeil et al., "Thermal stability of hydrocarbons: laboratory criteria and field examples", Energy & Fuels 1996, 10, 60-67.

Mango, "Transition metal catalysis in the genreation of natural gas", Organic Geochemistry 1996, 24, 977-984.

Mango, "Transition metal catalysis in the generation of petroleum and natural gas", 1993, OSTI as DE-FG05-92ER14295; NTIS.

Knauss et al., "hydrous pyrolysis on new albany and phosphoria shales: production kinetics of carboxylic acids and light hydrocarbons and interactions between the inorganic and organic chemical systems", Organic Geochemistry 1997, 27, 477-496.

* cited by examiner

GENERATING NATURAL GAS FROM HEAVY HYDROCARBONS

RELATED APPLICATIONS

This application is a continuation of Ser. No. 12/159,962, filed on Jul. 2, 2008, now U.S. Pat. No. 7,845,414, issued Dec. 7, 2010, which is a national stage entry of PCT/US2007/060215, filed on Jan. 8, 2007, which is a non-provisional of Ser. No. 60/757,168, filed on Jan. 6, 2006.

FIELD OF THE INVENTION

The invention relates in general to the production of natural gas from high molecular weight hydrocarbons and more particularly to generating natural gas from high molecular weight hydrocarbons.

BACKGROUND

This section provides background information to facilitate a better understanding of the various aspects of the invention. It should be understood that the statements in this section of this document are to be read in this light, and not as admissions of prior art.

Heavy hydrocarbons such as bitumen, kerogen, GILSONITE (a registered trademark of American Gilsonite Company for a mineral known as asphaltum, uintaite or uintahite), and tars are high molecular weight hydrocarbons frequently encountered in subterranean formations. These hydrocarbons range from thick viscous liquids to solids at ambient temperatures and are generally quite expensive to recover in useful form. Bitumen occurs naturally in tar sands in locations such as Alberta, Canada and in the Orinoco oil belt north of the Orinoco river in Venezuela. Kerogens are the precursors to fossil fuels, and are also the material that forms oil shales. Kerogens, believed to be the precursor to bitumens, are frequently found in sedimentary rock formations.

Heavy hydrocarbons in general, have been used in a number of applications such as in asphalt and tar compositions for paving roads and roofing applications and as an ingredient in waterproofing formulations. Importantly, they are a potentially valuable feedstock for generating lighter hydrocarbons. This is typically accomplished by thermal cracking and hydrogenolysis processes, for example.

Recovering heavy hydrocarbons whole or as lighter hydrocarbons and/or natural gas by thermal cracking in subterranean formations continues to be a challenge. The excessive temperatures necessary for thermal (or steam) cracking (about 850° C.) requires expensive, complex technology due to the special construction material to sustain high cracking temperatures and high energy input. Hydrogenolysis has limited utility when the recovery of lighter hydrocarbons is desirable. This is due to the difficulty of separating hydrogen from light olefins such as ethylene, propylene, and natural gas. Therefore, there is a continuing need for the development of methods for producing light hydrocarbons and natural gas from high molecular weight hydrocarbon feedstock.

SUMMARY

An exemplary embodiment of a method of producing natural gas from heavy hydrocarbons in a reactor in accordance with the invention includes mixing heavy hydrocarbons and a catalyst comprising a transition metal forming a heavy hydrocarbon catalyst mixture; flowing, in the reactor, an anoxic stimulation gas having a concentration of less than 1 ppm $O_2$, wherein the anoxic stimulation gas is not hydrogen; heating, in the reactor, the heavy hydrocarbon catalyst mixture in the presence of the anoxic stimulation gas; and generating a catalytic natural gas from the heavy hydrocarbons by a disproportionation reaction promoted by the catalyst.

In at least one embodiment the catalyst is isolated from a source rock. In some embodiments the heavy hydrocarbons in the mixture are isolated from a source rock. In some embodiment the mixture may comprise a source rock having heavy hydrocarbons and the catalyst. For example, mixing can comprise grinding a source rock comprising the heavy hydrocarbons and the catalyst. In some embodiments, the catalyst may be supplied in the anoxic stimulation gas.

In some embodiments the anoxic stimulation gas includes a gas selected from the group consisting of natural gas, carbon dioxide, helium, argon, and nitrogen. According to aspects of the invention, the anoxic stimulation gas is not comprised substantially of hydrogen. The anoxic stimulation gas can include the catalytic natural gas that is generated in the reactor.

In at least one embodiment the transition metal is selected from the group consisting of molybdenum, nickel, cobalt, iron, copper, palladium, platinum, rhodium, ruthenium, tungsten, osmium, rhenium, and iridium; and the catalyst further comprises salts of a main group element selected from the group consisting of sulfur, phosphorus, arsenic, and antimony.

According to one or more aspects of the invention, an exemplary embodiment of a method for catalytic generation of natural gas comprises creating an anoxic condition in a reactor containing a mixture of heavy hydrocarbons and a catalyst comprising a transition metal; heating the mixture in the anoxic conditions of the reactor; and generating in the reactor a catalytic natural gas from the heavy hydrocarbons by a disproportionation reaction promoted by the catalyst.

The mixture can include a source rock comprising the heavy hydrocarbons and the catalyst. The heavy hydrocarbons and/or the catalyst in the mixture may be isolated from a source rock.

Creating the anoxic condition can include flowing an anoxic stimulation gas having a concentration of less than 1 ppm $O_2$ in the reactor. According to one or more aspects of the invention, the anoxic stimulation gas is not substantially hydrogen (e.g., not pure hydrogen). The anoxic stimulation gas can include a gas selected from the group consisting of natural gas, carbon dioxide, helium, argon, and nitrogen. The natural gas can comprise the catalytic natural gas that is generated in the reactor.

Another exemplary method for forming natural gas includes providing a mixture of heavy hydrocarbons and a catalyst having at least one transition metal; adding an anoxic stimulation gas to the mixture, and heating the mixture in the presence of the stimulation gas.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the invention will be best understood with reference to the following detailed description of specific embodiments of the invention, when read in conjunction with the accompanying drawings, wherein.

DETAILED DESCRIPTION

Figure 1:
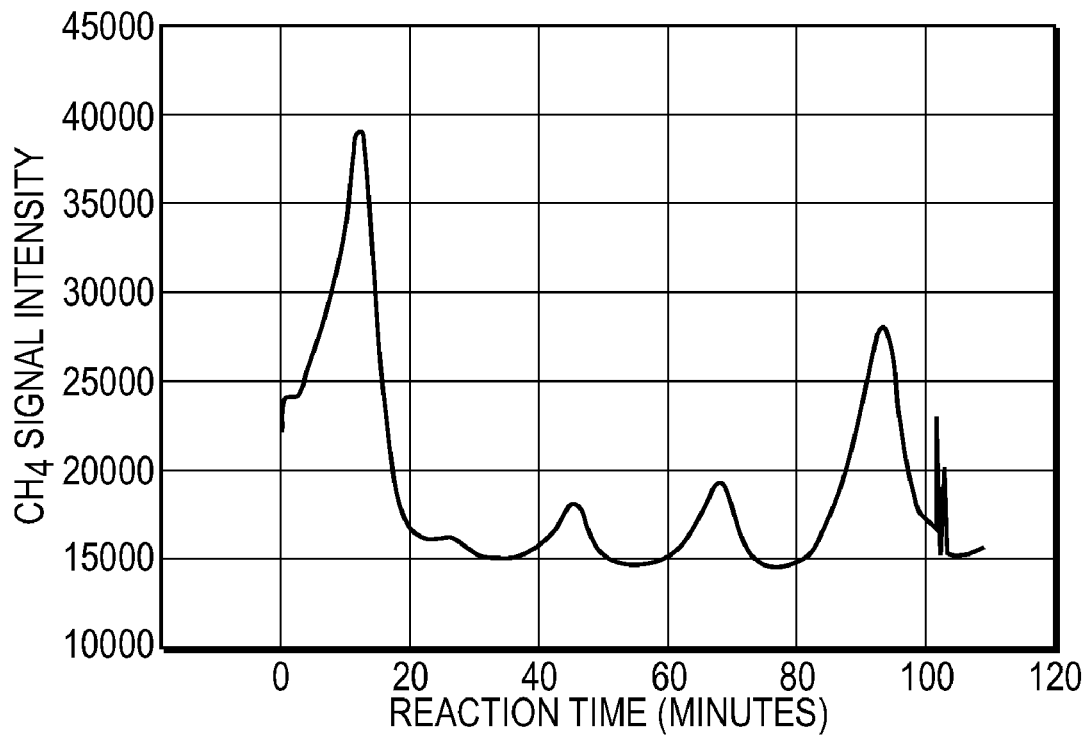
FIG. 1 is a plot showing the generation of methane over time from Barnett Shale in flowing helium at 250° C. (degrees Celsius).

Embodiments disclosed herein are directed to methods in which various transition metal-containing catalysts present as zero- or low-valent metal complexes, are co-injected with sand or other proppant into reservoirs rocks under sufficiently high pressures to fracture the rocks thus creating conduits of porous sand through which the transition metal complexes can pass into the regions of the formation containing heavy hydrocarbon materials. Alternatively, the catalysts may be delivered to hydrocarbon-containing sites within a formation using muds.

The method further includes closing the well (after introduction of stimulation gases) for sufficient time to allow metal catalyzed decomposition of bitumen (digestion) and gas generation. Thus, a method of producing natural gas from a heavy hydrocarbon-containing subterranean formation includes placing a catalyst which has at least one transition metal into the formation, injecting an anoxic stimulation gas into the formation (in some embodiments simultaneous with catalyst introduction), and collecting the natural gas generated in the formation.

Heavy Hydrocarbons: Heavy hydrocarbons as used herein include, but are not limited to all forms of carbonaceous deposits with sufficient hydrogen to convert to natural gas: (—CHx-)→gas+(—CHy-) where x>y. Examples include kerogens, solid hydrocarbons (GILSONITE, tars and the like), and bitumens. Such heavy hydrocarbons may be processed in situ in a formation. Alternatively, any of the hydrocarbons may also be reacted outside the context of a subterranean location, for example, in a batch reactor under carefully controlled conditions. Such conditions would include, for example, the substantial removal of oxygen which is prone to poisoning transition metal catalysts.

Catalyst: Typical source rocks, usually shales or limestones, contain about 1% organic matter, although a rich source rock might have as much as 20%. Source rocks convert their bitumen to natural gas at moderate temperatures (200° C.) in their natural state without hydrogen addition (see Experimental examples below). They do so chaotically, with random bursts of activity within periods of little or no activity, a phenomenon not uncommon in transition metal catalysis. Such behavior has been observed in a number of hydrogenation reactions including the hydrogenation of carbon monoxide, ethylene, and nitric oxide over Ni, Pt, Pd, Ir, Rh, and Ag (Eiswirth, M., 1993, Chaos in surface-catalyzed reactions; Ch. 6 in Chaos in Chemistry & Biochemistry, eds. R. J. Field & L. Gyorgyi, World Scientific Publishing Co., River Edge, N.J., USA, 141-174.) and in the hydrogenolysis of ethane over Ni and Pd (Kristyan, S., and Szamosi, J., 1992, Reaction kinetic surfaces and isosurfaces of the catalytic hydrogenolysis of ethane and its self-poisoning over Ni and Pd catalysts; Computers in Physics 6, 494-497.). Indeed, such chaotic behavior is an identifying characteristic of transition metal catalysis.

Therefore, in some embodiments, the method of converting heavy hydrocarbons to natural gas (oil-to-gas) may be accelerated in situ by injecting transition metals into reservoir rocks. The catalyst components may be obtained from an active source rock by isolation of the transition metals from active source rock. Alternatively, the source rock itself may be used without isolation of the individual active transition metals by generating a fine powder form of the source rock. One skilled in the art will recognize that under heterogeneous conditions high catalytic activity may be achieved by having catalyst particles with large surface area to volume ratios. Thus, it may be particularly beneficial to mill the source rock to very small particle size, for example, 10 nm-10,000 nm average diameter, though larger particles may be used as well.

In yet other embodiments, purified reagent grade transition metal components may be used and mixed in appropriate concentrations to reflect the naturally occurring compositions. For example, active source rocks may contain sufficient low-valent transition metals (100 to 10,000 ppb) to promote the reaction at reservoir temperatures (100° C. to 200+° C.) on a production time scale (days to years). Source rock activities may be determined experimentally in flowing helium at various temperatures. An assay procedure has been described by Mango (U.S. Pat. No. 7,153,688).

The transition metal may be a zero-valent transition metal, a low-valent transition metal, alloys, and mixtures thereof. Any transition metal that serves as a hydrogenation catalyst may be viable as a catalyst for the disproportionation reaction of heavy hydrocarbons. Various transition metals catalyze the hydrogenolysis of hydrocarbons to gas (Somorjai, G. A., 1994, Introduction to Surface Chemistry and Catalysis, John Wiley & Sons, New York, pg. 526); for example, $C_2H_6 + H_2 \rightarrow 2\ CH_4$. It has also been demonstrated that source rocks are catalytic in the hydrogenolysis of hydrocarbons (Mango, F. D. (1996) Transition metal catalysis in the generation of natural gas, *Org. Geochem.* 24, 977-984.) and that low-valent transition metals are catalytic in the hydrogenolysis of crude oil (Mango, F. D., Hightower, J. W., and James, A. T. (1994) Role of transition-metal catalysis in the formation of natural gas, *Nature*, 368, 536-538.). Furthermore, there is substantial evidence that low-valent transition metals are active agents in sedimentary rocks (U.S. Pat. No. 7,153,688). Active source rock may include transition metals such as molybdenum, nickel, cobalt, iron, copper, palladium, platinum, rhodium, ruthenium, tungsten, rhenium, osmium, and iridium.

The catalyst components may be immobilized and introduced into the subterranean formation on a proppant, in some embodiments. Alternatively, catalysts may be injected as gases, metal carbonyls, for example, which could dissolve in the carbonaceous sediments, decompose with time, thus delivering to the sediments low-valent active metals such as Ni, Co, Fe. Alternatively, the catalyst may be introduced at various stages in oil-based muds, for example. Fine metal particles could also be injected directly with sand in reservoir fracturing, thus dispersing fine particles of active catalyst throughout the network of porous sand conduits that carry hydrocarbons from the reservoir to the surface. Catalysts may be coated with paraffins ($C_8$ to $C_{18}$) to protect them from oxygen-poisoning while on the surface.

Stimulation gas: Since active metals in natural sedimentary rocks are poisoned irreversibly by oxygen (U.S. Pat. No. 7,153,688), it is beneficial that the stimulation be anoxic (<1 ppm $O_2$). Trace amounts of oxygen picked up in processing can be easily and inexpensively removed with commercial oxygen scrubbers. The stimulation gas may include natural gas, gas depleted of methane, carbon dioxide, helium, argon, and nitrogen. For natural gas (catalytic gas) production, hydrogen gas may interfere with separation and therefore is not an ideal stimulation gas. The stimulation gas may be the same gas used in fracturing the formation or may be different from that used in fracturing the formation. Again, the stimulation gas may also be used not only for the fracturing, but also as a means of depositing the catalyst within the formation. In some embodiments, the stimulation of catalytic gas generation from bitumen in reservoir rocks may be achieved through a single wellbore in a permeable reservoirs by injecting and withdrawing gas sequentially to create sufficient turbulence to stimulate chaotic gas generation or it may be achieved through multiple injection wells positioned to maximize continuous gas flow through the permeable reservoir to production wells that collect the injected gas plus catalytic gas. Production units would collect produced gas, injecting a fraction to maintain a continuous process and sending the remainder to market.

In reservoirs with insufficient permeability to sustain gas flow such as tight shales like the Mississippian Barnett Shale in the Fort Worth Basin (Tex.), fracturing the reservoir may be beneficial. Fracturing may be accomplished with injected sand or other appropriate proppant to create interlacing conduits of porous sand to carry injected gas through the reservoir to conduits of porous sands that carry the injected gas plus catalytic gas from the reservoir to production units. The flowing gas injected into the reservoir stimulates catalytic activity within the shale.

Injected gas may be natural gas produced from the deposit or natural gas produced from another deposit elsewhere. The process could be carried out by sequential injections where the reservoir is pressured, then allowed to stand and exhaust its induced pressure over time. This process could be repeated multiple times until the reservoir was exhausted of heavy hydrocarbons. The process could also be carried out in a continuous mode where gas is injected continuously into one well and withdrawn continuously from another. The two wells (or multiple wells) would be interconnected through a production unit that withdraws produced gas from the system sending excess gas to market and re-injecting the remainder to sustain continuous production.

Heavy hydrocarbon to natural gas: In addition to methods for in situ cracking of heavy hydrocarbons in a subterranean location, one may also produce natural gas from isolated heavy hydrocarbons in batch reactors, for example. To carry out such production the method entails mixing isolated heavy hydrocarbons (for example mined bitumen) with an active catalyst as described above. An anoxic stimulation gas may be introduced and the mixture heated under anoxic conditions.

Again the catalyst may be an active source rock ground into fine powder as described above. Alternatively, the active transition metal components may be isolated from the source rock or stock mixtures prepared from commercially available sources in proportions identified in high activity source rock.

The stimulation gas may be natural gas, natural gas depleted of methane, carbon dioxide, helium, argon, and nitrogen. In the context of batch reaction, such a stimulation gas may be provided as a flow while heating the bitumen catalyst mixture. Catalytic activity may be facilitated by heating in a range from about 25° C. to about 350° C. and from about 25° C. to about 250° C. in other embodiments. In particular embodiments, heating may be carried out in a range from about 100° C. to about 200° C. In all embodiments, it is beneficial that the stimulation gas be anoxic (<1 pp $O_2$).

Methods disclosed herein may be used in the production of natural gas (catalytic gas). The aforementioned method for the disproportionation of bitumen and high molecular weight hydrocarbons may be used in such production. This may be carried out in batch reactors, or generated directly from tar sand sources where it may be collected in the field and distributed commercially.

The following example is included to demonstrate particular embodiments of the invention. It should be appreciated by those of skill in the art that the methods disclosed in the example that follows merely represent exemplary embodiments of the invention. However, those of skill in the art should, in light of the present disclosure, appreciate that many changes can be made in the specific embodiments described and still obtain a like or similar result without departing from the spirit and scope of the invention.

Example 1

Barnett Shale, 250° C., Helium. A sample of Barnett shale (Mississippian, Ft. Worth Basin Tex.) (3.4 g), ground to a powder in anoxic argon, was placed in a reactor and purged of any adsorbed oxygen by flowing anoxic helium (through a commercial oxygen scrubber) through the reactor at 350° C. for 20 minutes. Helium flow (12 mL/min) was continued at 250° C. for over one hour while the effluent (i.e., stimulation) gas was monitored for methane by standard gas chromatographic (gc) analysis (FIG. 1). The first methane peak (presumably adsorbed and catalytic methane from the 10 min purge at 350° C.) emerged at 12.5 min ($5.8 \times 10^{-5}$ g $CH_4$) followed by a flat baseline over the next 20 min showing that the sample was no longer releasing methane. Three sharp peaks of increasing intensity then appeared at 45 min. ($9.9 \times 10^{-6}$ g $CH_4$), 68 min. ($1.6 \times 10^{-5}$ g $CH_4$), and 94 min. ($5.6 \times 10^{-5}$ g $CH_4$). The final three peaks constitute $2.2 \times 10^{-2}$ mg $CH_4$/(g rock hr) which is greater than that for this rock under our usual conditions (in hydrogen) ($5.7 \times 10^{-3}$ mg $CH_4$/(g rock hr).

Example 2

Figure 2:
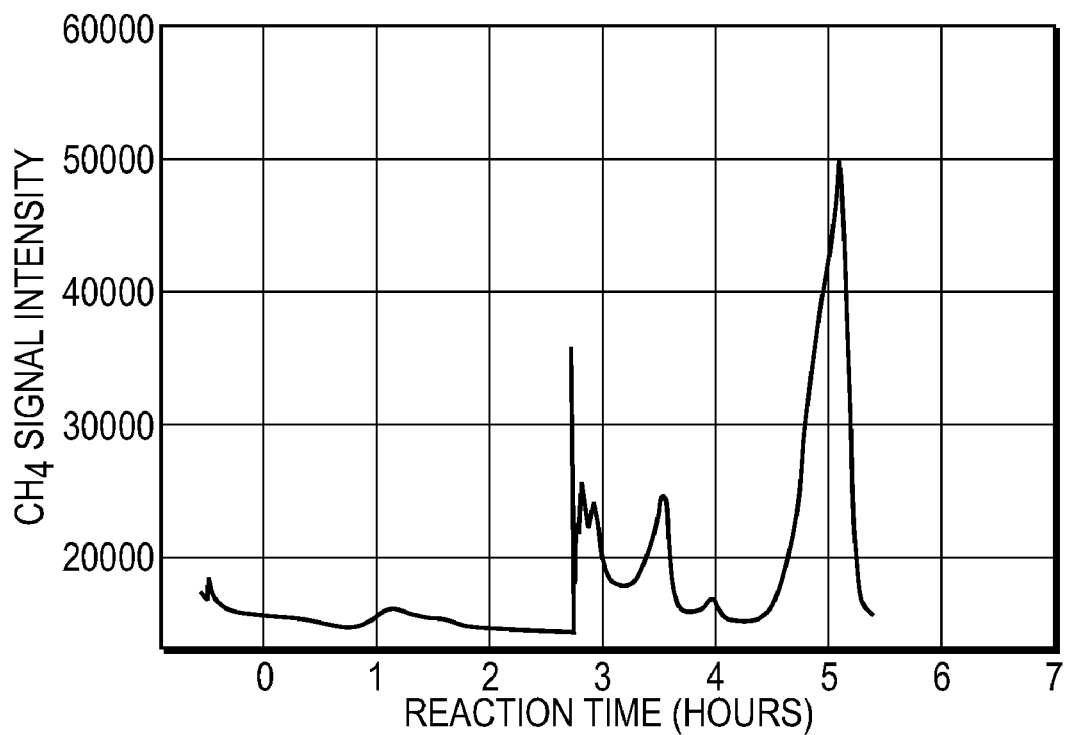
FIG. 2 is a plot showing the generation of methane over time from Monterey source rock KG-4 in flowing helium at 250° C.

Monterey Source Rock, 250° C., Helium. A sample of Monterey shale (Miocene, Calif.) (KG-4) (1.64 g) was analyzed under identical conditions under pure helium flow for about 7 hours (FIG. 2). After the initial peak of adsorbed gas (3 min., $2.7 \times 10^{-6}$ g $CH_4$), three very large peaks emerged after 5 hours of He flow, the first corresponding to $7.3 \times 10^{-4}$ g $CH_4$, the second (180 min. later) to $2.2 \times 10^{-4}$ g $CH_4$, and the third (285 min. after the first) to $1.1 \times 10^{-4}$ g $CH_4$, with an overall rate of 0.2 mg $CH_4$/(g rock hr), not materially different from that under hydrogen.

Example 3

Barnett Shale, 200° C., Helium. Pure helium (passed through an oxygen scrubber) was passed over a sample of Barnett Shale (2.88 g) (ground to a powder (60 mesh) in argon) at 200° C. for 140 minutes producing a burst of methane ($4 \times 10^{-2}$ mg) corresponding to a rate of $8.3 \times 10^{-3}$ mg $CH_4$/(g rock hr), a rate substantially greater than that obtained from the same experiment in hydrogen ($3.6 \times 10^{-5}$ mg $CH_4$/(g rock hr)) at this temperature and only slightly lower than that at 250° C.

It was observed that activity increases only slightly with temperature in helium suggesting rate suppression counteracting the usual Arrhenius exponential rate increase with temperature. The higher-than-expected activities observed in helium at 200° C. suggests higher than anticipated activities at subsurface temperatures and the expectation of promoting the conversion of heavy hydrocarbon to natural gas at moderate reservoir temperatures by injecting low-valent active transition metals into these reservoirs.

Example 4

A Monterey shale (Miocene, Calif.) sample generates methane at a rate of ~$6 \times 10^{-6}$ g $C_1$/(g rock hr) in hydrogen gas containing 3% propane under closed conditions (30 minutes) at 250° C. and generates very little methane at 200° C. under the same conditions (30 minutes). Under flowing helium at 200° C., the same rock converts its bitumen to gas at a rate of $1.3 \times 10$-4 g $C_1$/(g rock hr). These results suggest that the mass-transfer stimulation gas may achieve two positive effects: 1) it transports hydrocarbons from heavy hydrocarbon deposits to active catalytic sites, and 2) it removes activity-suppressing agents (products and adsorbents) from the active sites catalyst surfaces.

Advantageously, the methods describe herein provide a means for recovery useful catalytic gas from heavy hydrocarbons in situ from subterranean formations. When used in situ at the site of a formation, the conversion of heavy hydrocarbon extends the useful lifetime of reservoir enhancing the oil recovery process. The same process may be duplicated under controlled conditions in batch reactors for commercial production of natural gas. Furthermore, the availability of certain heavy hydrocarbons, such as bitumen, from renewable resources may provide an environmentally sound means for natural gas production.

All patents and publications referenced herein are hereby incorporated by reference to the extent not inconsistent herewith. It will be understood that certain of the above-described structures, functions, and operations of the above-described embodiments are not necessary to practice the invention and are included in the description simply for completeness of an exemplary embodiment or embodiments. In addition, it will be understood that specific structures, functions, and operations set forth in the above-described referenced patents and publications can be practiced in conjunction with the invention, but they are not essential to its practice. It is therefore to be understood that the invention may be practiced otherwise than as specifically described without actually departing from the spirit and scope of the invention as defined by the appended claim.

From the foregoing detailed description of specific embodiments of the invention, it should be apparent that a novel method for converting bitumen to natural gas has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of producing, in a reactor, natural gas from heavy hydrocarbons, comprising:
    mixing heavy hydrocarbons and a catalyst and forming a heavy hydrocarbon catalyst mixture;
    flowing, in the reactor, an anoxic stimulation gas having a concentration of less than 1 ppm $O_2$ by volume, wherein the anoxic stimulation gas is not hydrogen;
    heating in a range from about 25° C. to about 250° C., in the reactor, the heavy hydrocarbon catalyst mixture in the presence of the anoxic stimulation gas; and
    generating a catalytic natural gas from the heavy hydrocarbons by a disproportionation reaction promoted by the catalyst;
    wherein the catalyst is a source rock comprising a transition metal or is a mixture of compounds in proportions identified in a source rock comprising a transition metal.

2. The method of claim 1, wherein the heavy hydrocarbons are isolated from a source rock.

3. The method of claim 1, wherein the mixing comprises grinding a source rock comprising the heavy hydrocarbons and the catalyst.

4. The method of claim 1, wherein the transition metal is selected from the group consisting of a zero-valent transition metal, a low-valent transition metal, alloys, and mixtures thereof.

5. The method of claim 1, wherein the transition metal is selected from the group consisting of molybdenum, nickel, cobalt, iron, copper, palladium, platinum, rhodium, ruthenium, tungsten, osmium, rhenium, and iridium.

6. The method of claim 1, wherein the catalyst further comprises salts of a main group element selected from the group consisting of sulfur, phosphorus, arsenic, and antimony.

7. The method of claim 1, wherein the anoxic stimulation gas comprises a gas selected from the group consisting of natural gas, carbon dioxide, helium, argon, and nitrogen.

8. The method of claim 7, wherein the anoxic stimulation gas further comprises a portion of the catalytic natural gas generated.

9. The method of claim 1, wherein:
    the transition metal is selected from the group consisting of molybdenum, nickel, cobalt, iron, copper, palladium, platinum, rhodium, ruthenium, tungsten, osmium, rhenium, and iridium; and
    the catalyst further comprises salts of a main group element selected from the group consisting of sulfur, phosphorus, arsenic, and antimony.

10. The method of claim 9, wherein the anoxic stimulation gas comprises a gas selected from the group consisting of natural gas, carbon dioxide, helium, argon, and nitrogen.

11. A method for catalytic generation of natural gas, comprising:
    creating an anoxic condition in a reactor containing a mixture of heavy hydrocarbons and a catalyst;
    heating the mixture in the anoxic conditions of the reactor in a range from about 25° C. to about 250° C.; and
    generating in the reactor a catalytic natural gas from the heavy hydrocarbons by a disproportionation reaction promoted by the catalyst;
    wherein creating the anoxic condition comprises flowing an anoxic stimulation gas having a concentration of less than 1 $O_2$ in the reactor; and
    wherein the catalyst is a source rock comprising a transition metal or is a mixture of compounds in proportions identified in a source rock comprising a transition metal.

12. The method of claim 11, wherein the mixture comprises a source rock comprising the heavy hydrocarbons and the catalyst.

13. The method of claim 11, wherein the transition metal is selected from the group consisting of a zero-valent transition metal, a low-valent transition metal, alloys, and mixtures thereof.

14. The method of claim 12, wherein the anoxic stimulation gas comprises a gas selected from the group consisting of natural gas, carbon dioxide, helium, argon, and nitrogen.

15. The method of claim 12, wherein the anoxic stimulation gas is not hydrogen.

16. The method of claim 12, wherein:
    the transition metal is selected from the group consisting of molybdenum, nickel, cobalt, iron, copper, palladium, platinum, rhodium, ruthenium, tungsten, osmium, rhenium, and iridium; and
    the catalyst further comprises salts of a main group element selected from the group consisting of sulfur, phosphorus, arsenic, and antimony.

17. The method of claim 16, wherein the anoxic stimulation gas comprises a gas selected from the group consisting of natural gas, carbon dioxide, helium, argon, and nitrogen.

* * * * *